United States Patent
Yang et al.

(10) Patent No.: US 12,032,227 B2
(45) Date of Patent: Jul. 9, 2024

(54) BESPOKE EYEWEAR AND SYSTEM AND METHOD FOR MANUFACTURING BESPOKE EYEWEAR

(71) Applicant: LuxMea Studio, LLC, Somerville, MA (US)

(72) Inventors: Qian Yang, Cambridge, MA (US); Steven Avis, Toronto (CA)

(73) Assignee: LuxMea Studio LLC, Somerville, MA (US)

( * ) Notice: Subject to any disclaimer, the term of this patent is extended or adjusted under 35 U.S.C. 154(b) by 842 days.

(21) Appl. No.: 17/084,152

(22) Filed: Oct. 29, 2020

(65) Prior Publication Data

US 2021/0173230 A1 Jun. 10, 2021

Related U.S. Application Data

(60) Provisional application No. 62/928,068, filed on Oct. 30, 2019.

(51) Int. Cl.
| | | |
|---|---|---|
| *G02C 13/00* | (2006.01) | |
| *B29C 64/393* | (2017.01) | |
| *B29D 12/02* | (2006.01) | |
| *G02C 5/22* | (2006.01) | |
| *G02C 7/02* | (2006.01) | |
| *G06V 40/16* | (2022.01) | |
| *B33Y 50/02* | (2015.01) | |
| *G06V 10/10* | (2022.01) | |

(52) U.S. Cl.
CPC .......... *G02C 13/003* (2013.01); *B29C 64/393* (2017.08); *B29D 12/02* (2013.01); *G02C 5/22* (2013.01); *G02C 7/027* (2013.01); *G06V 40/169* (2022.01); *G06V 40/171* (2022.01); *B33Y 50/02* (2014.12); *G06V 10/16* (2022.01)

(58) Field of Classification Search
CPC ........ G02C 13/003; G02C 5/22; G02C 7/027; B29C 64/393; G06V 40/169; G06V 40/171; B29D 12/02
USPC ..................................... 351/159.76
See application file for complete search history.

(56) References Cited

U.S. PATENT DOCUMENTS

| | | | |
|---|---|---|---|
| 9,810,927 B1* | 11/2017 | Fenton | B29D 12/02 |
| 2015/0055086 A1* | 2/2015 | Fonte | G06F 16/22 700/98 |
| 2016/0062151 A1 | 3/2016 | Fonte et al. | |
| 2016/0299360 A1* | 10/2016 | Fonte | G02C 7/028 |

(Continued)

FOREIGN PATENT DOCUMENTS

WO WO-2017205903 A1 * 12/2017 ........... G02C 13/003

*Primary Examiner* — James R Greece
(74) *Attorney, Agent, or Firm* — Hsuanyeh Law Group, PC

(57) ABSTRACT

The present disclosure provides a bespoke eyewear and a system and a method for manufacturing the bespoke eyewear. In one aspect, the method for manufacturing the bespoke eyewear frame includes capturing one or more facial images of a user using an image capturing device, generating a facial model from said one or more facial images, extracting a plurality of facial parameters from the facial model, generating a three-dimensional digital model of an eyewear frame based at least in part on one or more of the facial parameters of the user, and transmitting the three-dimensional digital model to an additive manufacturing apparatus for additively manufacturing the bespoke eyewear frame.

5 Claims, 13 Drawing Sheets

(56) References Cited

U.S. PATENT DOCUMENTS

2017/0248802 A1     8/2017   Rasschaert et al.
2018/0017815 A1     1/2018   Chumbley et al.

* cited by examiner

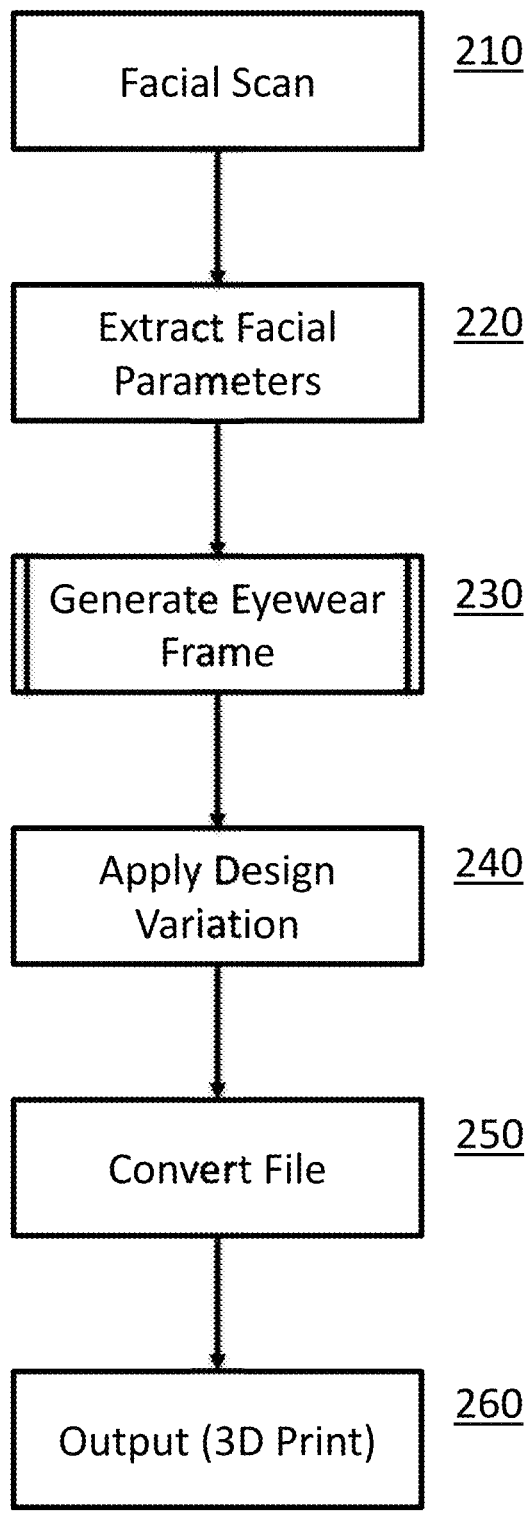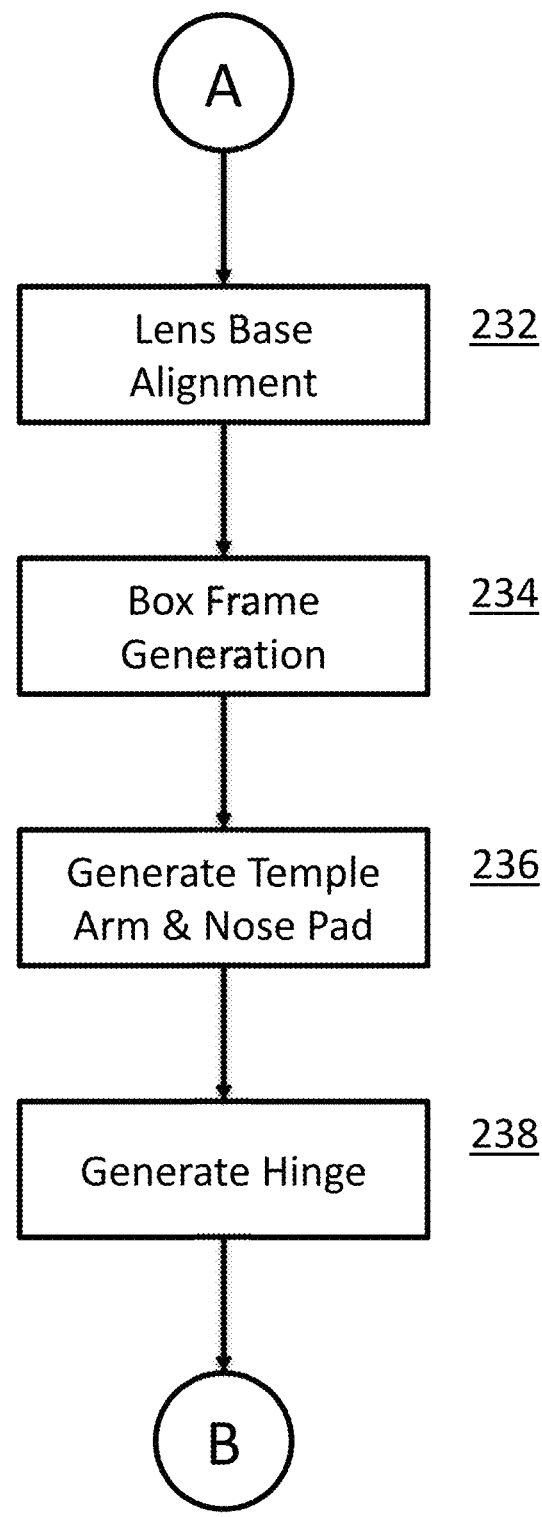
FIG. 2A
FIG. 2B

BESPOKE EYEWEAR AND SYSTEM AND METHOD FOR MANUFACTURING BESPOKE EYEWEAR

RELATED APPLICATION

This application claims the benefit of priority to U.S. Provisional Application No. 62/928,068, filed Oct. 30, 2019, the entire contents of which are incorporated herein by reference for all purposes.

TECHNICAL FIELD

The present disclosure relates to bespoke eyewear and a system and a method for manufacturing the bespoke eyewear. More particularly, the present disclosure relates to bespoke eyewear having a seamless hinge structure and a system and a method for manufacturing the bespoke eyewear.

BACKGROUND

Additive manufacturing, a.k.a., 3D printing, has been widely used to produce customized products including eyewear. Traditionally, to make customized eyewear, an optomaltrist needs to manually take measurements of a patient's face so as to provide facial dimension parameters to the additive manufacturing equipment for further processing.

People have attempted to use optical scanning of a consumer's face to enhane the precision and user experience for the facial measurement. See, for example, U.S. Pre-Grant Publication No. 2016/0062151 to Fonte et al. Existing technology, however, still requires the bespoke eyewear frame be produced in pieces and then assembled manually by a human worker or automatically by a robot.

In view of the above, there is a need to design and develop new bespoke eyewear and a new system and a new method for manufacturing the bespoke eyewear, such that manual or automatic assembly is minimized and/or eliminated.

SUMMARY

Embodiments of the present disclosure provide a seamless bespoke eyewear, and a system and a method for manufacturing the seamless bespoke eyewear using facial parameters of a user to produce customized eyewear frames based on the user's comfort level and optician requirements.

In one aspect, the present disclosure provides a method for manufacturing a bespoke eyewear frame, the method comprising capturing one or more facial images of a user using an image capturing device; generating a facial model from said one or more facial images; extracting a plurality of facial parameters from the facial model; generating a three-dimensional digital model of an eyewear frame based at least in part on one or more of the facial parameters of the user; and transmitting the three-dimensional digital model to an additive manufacturing apparatus for additively manufacturing the bespoke eyewear frame.

In one embodiment, generating the three-dimensional digital model comprises: aligning a lens base in accordance with one or more of the facial parameters, the lens base being defined by a plurality of lens parameters; and generating the three-dimensional digital model of the eyewear frame based on the aligned lens base.

In one embodiment, the facial parameters include a Nasal Crest (NC) and a Pupil Center (PC), and the lens parameters include a Geometric Center (GC), a Wrap Angle (WA), and a Pantoscopic Angle (PA), and wherein aligning the lens base comprises: determining the Pantoscopic Angle (PA) and the Wrap Angle (WA); rotating the lens base on a first plane about the Geometric Center (GC) for the Pantoscopic Angle (PA); rotating the lens base on a second plane about the Geometric Center (GC) for the Wrap Angle (WA), the second plane being perpendicular to the first plane.

In one embodiment, generating the three-dimensional digital model of the eyewear frame based on the aligned lens base comprises: generating a box frame defined as an area between a quadrilateral box frame maximum and a quadrilateral box frame minimum in accordance with one or more of the facial parameters and the lens parameters of the aligned lens base; generating a design box frame within the area of the box frame; generating temple arms, a nose pad, and a nose bridge mechanically coupled with the design box frame; and generating a seamless hinge structure pivotably connecting the temple arms and the design box frame.

In one embodiment, generating the seamless hinge structure comprises: generating a post integrally formed on the temple arms; and generating a knuckle integrally formed on the design box frame and mechanically engaged with the post.

In one embodiment, the method further comprises applying design variations to the the three-dimensional digital model based on a pre-determined aesthetic style of the bespoke eyewear frame.

In one embodiment, the method further comprises, prior to transmitting the three-dimensional digital model to the additive manufacturing apparatus, converting the three-dimensional digital model into an additively printable format.

In another aspect, the present disclosure provides an apparatus for manufacturing a bespoke eyewear frame, the apparatus comprising: an image capturing device configured to capture one or more facial images of a user; a facial model generation module configured to generate a facial model from said one or more facial images; a facial parameter extraction module configured to extract a plurality of facial parameters from the facial model; an eyewear frame generation module configured to a three-dimensional digital model of an eyewear frame based at least in part on one or more of the facial parameters of the user; and a file output module configured to transmit the three-dimensional digital model to an additive manufacturing apparatus for additively manufacturing the bespoke eyewear frame.

In one embodiment, the eyewear frame generation module comprises a lens base alignment module configured to align a lens base in accordance with one or more of the facial parameters, the lens base being defined by a plurality of lens parameters, and wherein the eyewear frame generation module is configured to generate the three-dimensional digital model of the eyewear frame based on the aligned lens base.

In one embodiment, the facial parameters include a Nasal Crest (NC) and a Pupil Center (PC), and the lens parameters include a Geometric Center (GC), a Wrap Angle (WA), and a Pantoscopic Angle (PA), and wherein the lens base alignment module is further configured to: determine the Pantoscopic Angle (PA) and the Wrap Angle (WA); rotate the lens base on a first plane about the Geometric Center (GC) for the Pantoscopic Angle (PA); and rotate the lens base on a second plane about the Geometric Center (GC) for the Wrap Angle (WA), the second plane being perpendicular to the first plane.

In one embodiment, the eyewear frame generation module is further configured to: generate a box frame defined as an area between a quadrilateral box frame maximum and a quadrilateral box frame minimum in accordance with one or more of the facial parameters and the lens parameters of the aligned lens base; generate a design box frame within the area of the box frame; generate temple arms, a nose pad, and a nose bridge mechanically coupled with the design box frame; and generate a seamless hinge structure pivotably connecting the temple arms and the design box frame.

In one embodiment, the eyewear frame generation module is further configured to: generate a post integrally formed on the temple arms; and generate a knuckle integrally formed on the design box frame and mechanically engaged with the post.

In one embodiment, the apparatus further comprises a design variation module configured to apply design variations to the the three-dimensional digital model based on a pre-determined aesthetic style of the bespoke eyewear frame.

In one embodiment, the apparatus further comprises a file conversion module configured to convert the three-dimensional digital model into an additively printable format, prior to the file output module transmits the three-dimensional digital model to the additive manufacturing apparatus.

In still another aspect, the present disclosure provides an eyewear comprising a main frame, left and right temple arms, and left and right hinge structures respectively connecting the left and right temple arms to the main frame, wherein the left and right hinge structures are seamlessly integrated with the main frame and the left and right temple arms respectively.

In one embodiment, each of the left and right hinge structures comprises a post integrally formed on one of the left and right temple arms, and a knuckle integrally formed on the main frame and mechanically engaged with the post.

In one embodiment, the post has a cylindrical shape integrally formed on an end of the temple arm through two legs conntected to respective ends of the post.

In one embodiment, the knuckle comprises a cylindrical throughhole that accomondates the post therein.

In one embodiment, the knuckle has a substantially spherical shape and wherein each of the left and right temple arms has a recess formed between the two legs and having a shape complimentary to that of the knuckle to receive at least a portion of the knuckle therein.

In one embodiment, each of the left and right hinge structures comprise a lock positive on the left and right temple arms and a lock negative on the main frame having a shape complimentary to that of the lock positive.

BRIEF DESCRIPTION OF THE DRAWINGS

FIGS. 2A and 2B illustrate a flow diagram of a method for manufacturing bespoke eyewear in accordance with an embodiment of the present disclosure.

DETAILED DESCRIPTION

Figure 1:
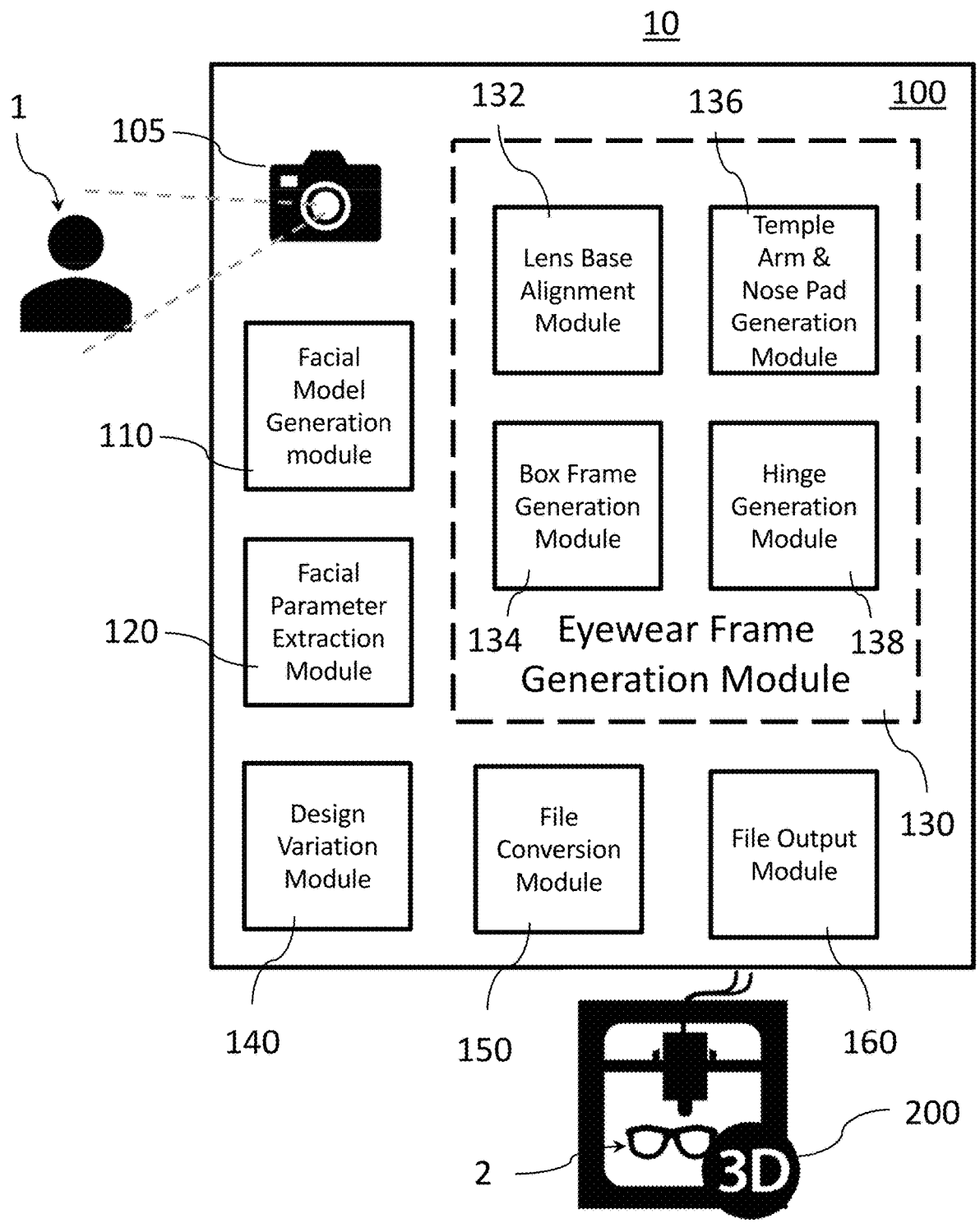
FIG. 1 illustrates an apparatus for manufacturing bespoke eyewear in accordance with an embodiment of the present disclosure.

Referring to FIG. 1, there is illustrated a system 10 for manufacturing bespoke eyewear in accordance with an embodiment of the present disclosure. System 10 includes a data processing apparatus 100 for acquiring facial images of a user 1 and for generating a 3D-printable digital model of a bespoke eyewear frame 2, and a production apparatus 200 for additively manufacturing bespoke eyewear frame 2. In one embodiment, data processing apparatus 100 may be a smartphone device, a tablet device, a laptop computer device, or any other suitable data processing deive.

As shown in FIG. 1, data prcessing apparatus 100 includes a camera 105, a facial model generation module 110, a facial parameter extraction module 120, an eyewear frame generation module 130, a design variation module 140, a file conversion module 150, and a file output module 160. In one embodiment, camera 105 may include a depth sensor for scanning and recognizing critical points on a scanned surface. Camera 105 can be a smartphone camera with one or more lenses, or a 3D scanner (such as, structured-light 3D scanners) with two or more scanners so to capture 3D images of an object.

In one embodiment, eyewear frame generation module 130 includes a lens base alignment 132, a box frame generation module 134, a temple arm & nose pad generation module 136, and a hinge generation module 138. Data prcessing apparatus 100 may further include a processor (not shown) and a non-volatile memory (not shown), while modules 110, 120, 130, 140, 150, and 160 can be implemented as computer software products stored in the non-volatile memory and executable by the processor to perform their designated functions.

In one embodiment, production apparatus 200 is a 3D printer communicatively connected with data processing apparatus 100 for receiving 3D-printable digital models therefrom. In one embodiment, production apparatus 200 is directly coupled to data processing apparstus 100 via a cable wire, such as, a universal serial bus (USB) cable. Alternatively, production apparstus 200 can be coupled to data processing apparstus 100 via wireless computer network, such as WiFi, 4G, 5G, and the like.

FIGS. 2A and 2B illustrate a flow diagram of a method for manufacturing bespoke eyewear in accordance with an embodiment of the present disclosure. Referring to FIGS. 2A and 2B together with FIG. 1, in Step 210, the face or head of user 1 is optically scanned using camera 105 to obtain one or more facial images of user 1. The facial images of user 1 can be saved in the non-volatile memory of data processing apparatus 100 and transmitted to facial model generation module 110 to generate a 3D facial model.

Figure 3A:
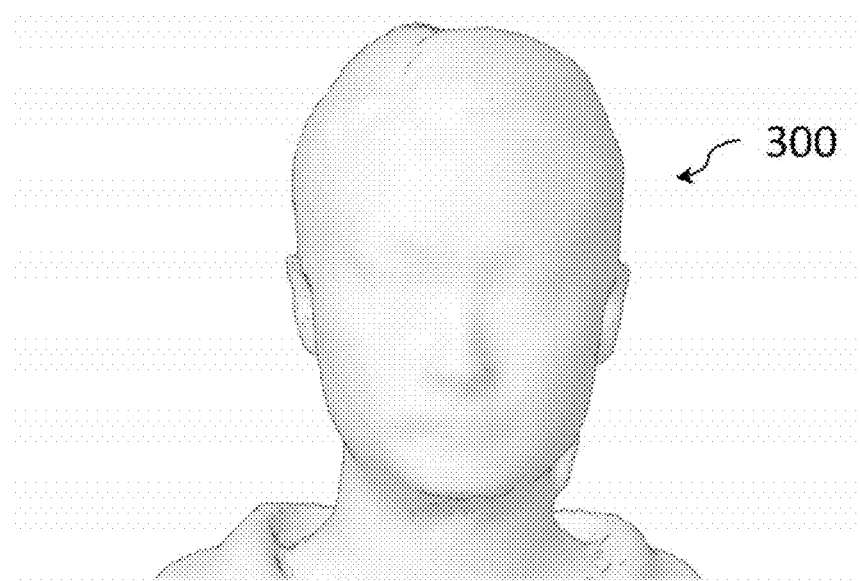
FIGS. 3A, 3B, and 3C respectively illustrate a front view, a top view, and a side view of a facial model captured by a 3D scanner in accordance with an embodiment of the present disclosure.
Figure 3B:
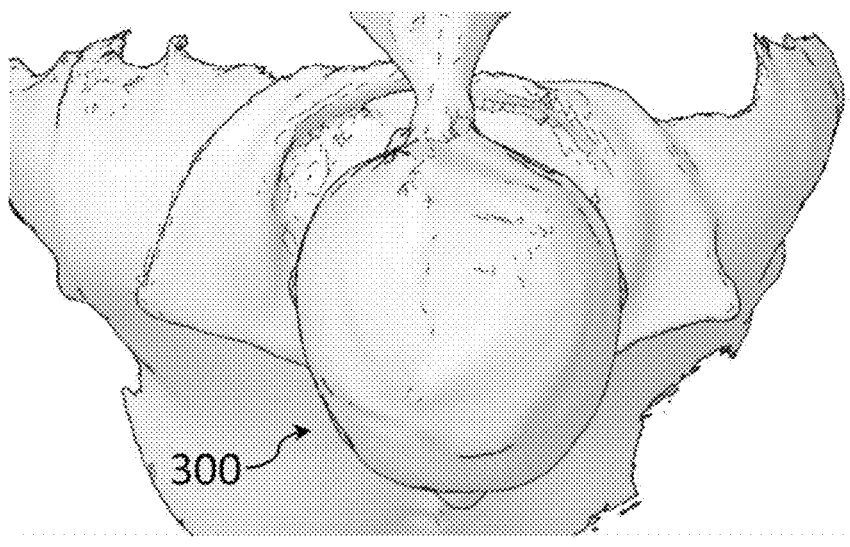
Figure 3C:
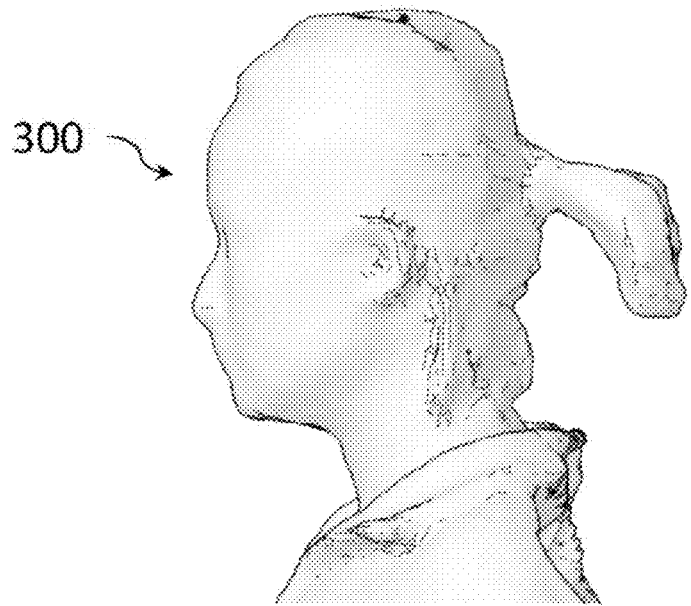

FIGS. 3A, 3B, and 3C respectively illustrate a front view, a top view, and a side view of a facial model 300 captured by camera 105 in accordance with an embodiment of the present disclosure. In various embodiments, facial model 300 may be represented as a surface mesh, a point cloud, a distance map, an image volume, a vector space, or any other proper 3D representations. Facial model 300 can be saved in the non-volatile memory of data processing apparatus 100 and transmitted to facial module extraction module 120 for further processing.

In Step 220, facial module extraction module 120 analyzes facial model 300 to extract the 3D coordinates (x, y, z) of various facial parameters 400. In one embodiment, facial parameters 400 include, for example, Pupil Centre (PC), Lateral Brow (LtB), Medial Brow (MB), Superciliary Ridge (SR), Lower Eyelid (LE), Nasal Crest (NC), Lateral Nasal Cartilage (LNC), Super Helix (SH), Levator Labii Superioris (LLS), Lateral Canthus (LC), Medial Canthus (MC), Bridge Point (BP), and Concha Back (CB).

Figure 4A:
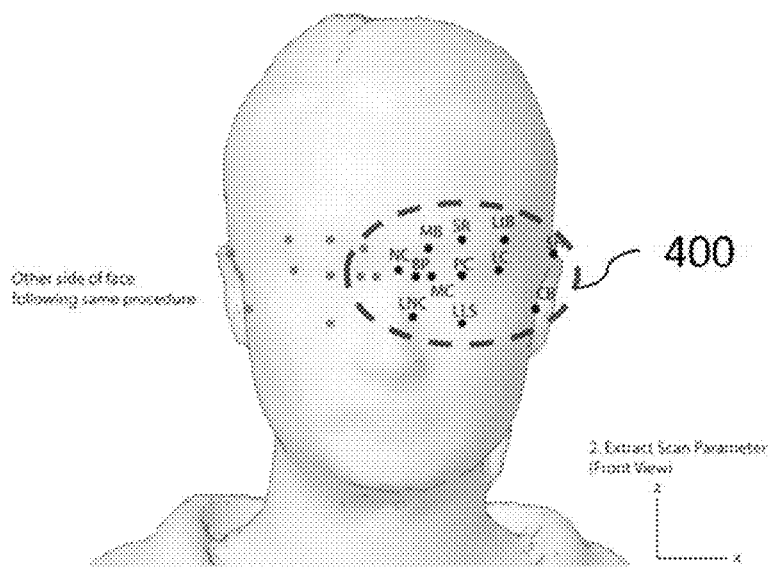
FIGS. 4A, 4B, and 4C respectively illustrate a front view, a top view, and a side view of the facial model in FIGS. 3A, 3B, and 3C marked with extracted facial parameters in accordance with an embodiment of the present disclosure.
Figure 4B:
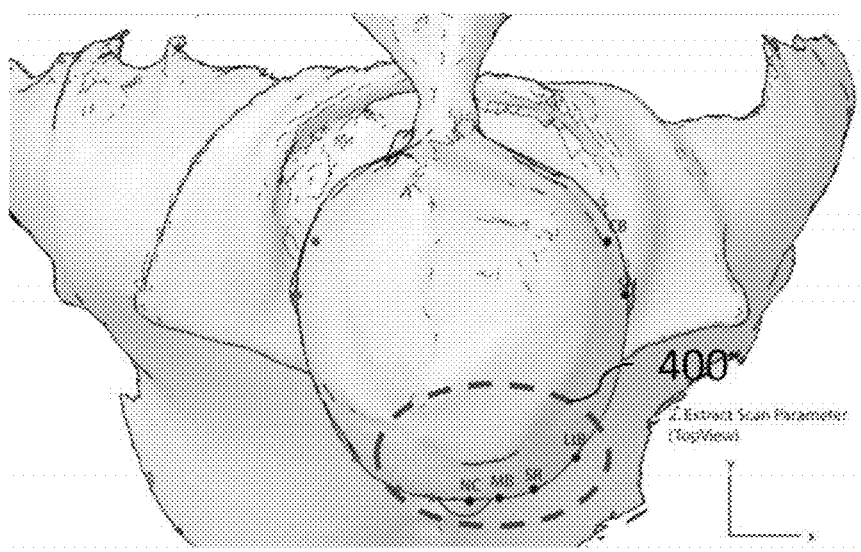
Figure 4C:
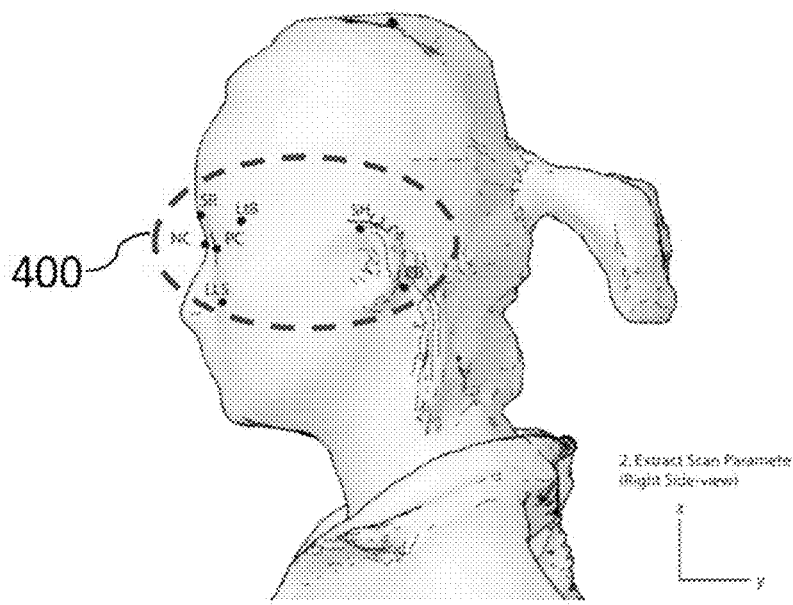

FIGS. 4A, 4B, and 4C respectively illustrate a front view, a top view, and a side view of facial model 300 in FIGS. 3A, 3B, and 3C marked with facial parameters 400 in accordance with an embodiment of the present disclosure. Specifically, FIG. 4A illustrates a a front view of the facial model of FIG. 3A with facial parameters 400 being marked on the X-Z plane. FIG. 4B illustrates a a top view of the facial model of FIG. 3B with facial parameters 400 being marked on the X-Y plane. FIG. 4C illustrates a a side view of the facial model of FIG. 3C with facial parameters 400 being marked on the Y-Z plane. Facial parameters 400 can be saved in the non-volatile memory of data processing apparatus 100 and transmitted to eyewear frame generation module 130 for further processing.

In one embodiment, one or more facial parameters 400 can be automatically measured and extracted through a facial recognition computer software program with the assistance of artificial intelligence (AI), such as, deep learning. Alternatively, one or more facial parameters 400 can be extracted from a plurality of 2D facial images using photogrammetry technology and/or manually measured by an eyewear specialist. While FIGS. 4A, 4B, and 4C only show facial parameters 400 at one (left) side of the user's face, it is appreciated that facial parameters 400 at the other (right) side of the user's face is not necessarily symmetric. The same extraction method can be applied to facial model 300 of the full-face, such that a 3D printable digital model of asymmetrical eyewear frame 2 can be calculated and generated.

In Step 230, eyewear frame generation module 130 generates a digital 3D model of eyewear frame 2 based on facial parameters 400 obtained in Step 220. In one embodiment, Step 230 is further divided into sub-Steps 232, 234, 236, and 238 as shown in FIG. 2B from cirle A to circle B.

In Step 232, lens base alignment module 132 aligns a lens base 600 (see, FIG. 6) of bespoke eyewear in accordance with facial parameters 400. Lens base 600 is a lens manufacturing standard defined in accordance with a spherical cap. To perform lens base alignment, a plurality of lens parameters 500, such as, Geometric Center (GC), Wrap Angle (WA), Pantoscopic Angle (PA), Lens Base Center (LBC) and Lens Base (LB) (i.e., circumference), must be determined.

Figure 5A:
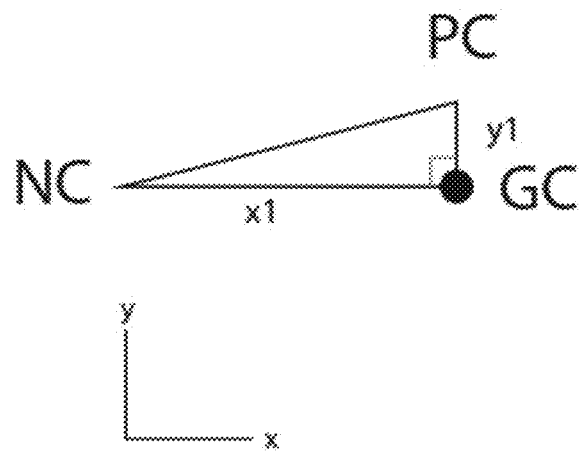
FIGS. 5A through 5F illustrate geometrical relations of various lens parameters with respect to facial parameters in accordance with an embodiment of the present disclosure.

As shown in FIG. 5A, in one embodiment, Geometric Center (GC) of lens parameters 500 can be calculated from Nasal Crest (NC) and Pupil Center (PC) of facial parameters 400 that are extracted from Step 220 in the X-Y Coordinate (see, FIG. 4B), where the Z-values of NC and PC are set to be 0, namely, NC=(NC_x, NC_y, 0) and/or PC=(PC_x, PC_y, 0). To determine Geometric Center (GC), a horizontal line passing through NC and a vertical line passing through PC are generated on the X-Y plane. In one embodiment, the horizontal line can be in parallel to the line passing through the pupil centers of left and right eyes, while the vertical line is perpendicular to the horizontal line. In alternative embodiments, the horizontal line can be defined by any other suitable reference points in accordance with the orientation of facial model 300 on the X-Y plane.

In one embodiment, GC is defined as the intersection point of the generated horizontal and vertical lines. Horizontal line NC-GC has a length "x1," while vertical line PC-GC has a length "y1," where lines NC-GC and PC-GC are perpendicular to each other, i.e., line NC-GC ⊥ line PC-GC. Now that GC can be determined as GC=(GC_x, GC_y, GC_z), where GC_x=NC_x+x1, GC_y=PC_y−y1, and GC_z=PC_z.

Figure 5B:
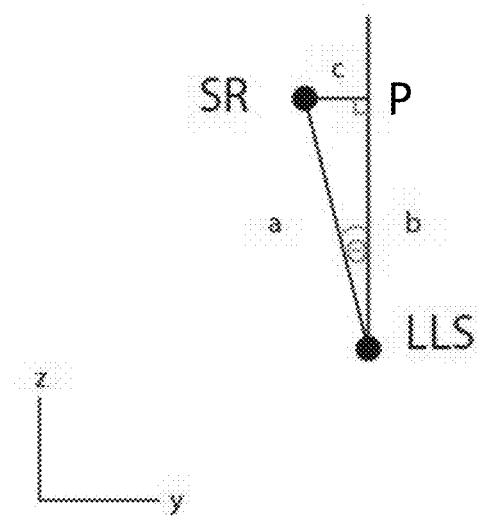

As shown in FIG. 5B, in one embodiment, Pantoscopic Angle (PA) defined by Θ of lens parameters 500 can be calculated from Superciliary Ridge (SR) and Levator Labil Superioris (LLS) of facial parameters 400 extracted from Step 220 in the Y-Z Coordinate (see, FIG. 4C), where the X-values of SR and LLS are set to be 0, namely, SR=(0, SR_y, SR_z) and LLS=(0, LLS_y, LLS_z). To determine Pantoscopic Angle (PA), a horizontal line passing through SR and a vertical line passing through LLS are generated on the Y-Z plane. In one embodiment, the horizontal and vertical lines intersect at point P and can be defined respectively as being parallel to the Y- and Z-coordinates of the Y-Z plane in accordance with a suitable orientation of facial model 300.

In this embodiment, line SR-LLS together with the horizontal line passing through SR and the vertical line passing through LLS form a right-angled triangle. Line SR-LLS has a length "a," line LLS-P has a length "b," and line SR-P has a length "c." In one embodiment, Pantoscopic Angle (PA) or angle Θ can be defined as the angle at vertex LLS, which can be determined using trigonometry, where Θ=arcsin (c/a).

Figure 5C:
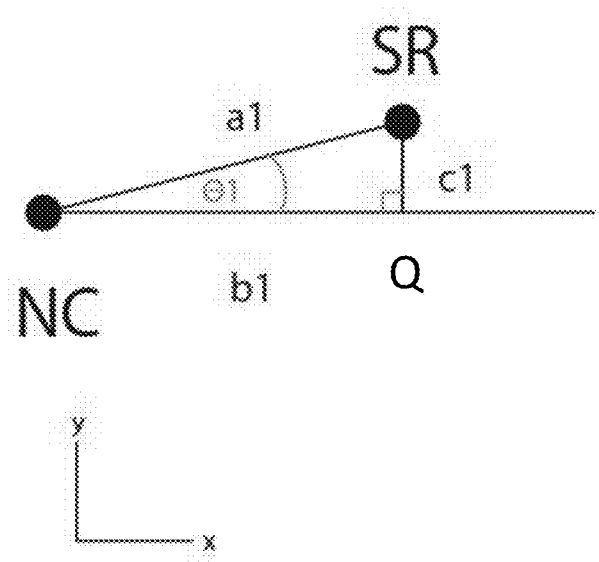

As shown in FIG. 5C, in one embodiment, Wrap Angle (WA) defined by Θ1 of lens parameters 500 can be calculated from Superciliary Ridge (SR) and Nasal Crest (NC) of facial parameters 400 extracted from Step 220 in the X-Y Coordinate (see, FIG. 4B), where the Z-values of SR and NC are set to be 0, namely, SR=(SR_x, SR_y, 0) and NC=(NC_x, NC_y, 0). To determine Wrap Angle (WA), a horizontal line passing through NC and a vertical line passing through SR are generated on the X-Y plane. In one embodiment, the horizontal and vertical lines intersect at point Q and can be defined respectively as being parallel to the X-and Y-coordinates of the X-Y plane in accordance with a suitable orientation of facial model 300.

In this embodiment, line SR-NC together with the horizontal line passing through NC and the vertical line passing through SR form a right-angled triangle. Line SR-NC has a length "a1," line NC-Q has a length "b1," and line SR-Q has a length "c1." In one embodiment, Wrap Angle (WA) or angle Θ1 can be defined as the angle at vertex NC, which can be determined using trigonometry, where Θ1=arcsin (c1/a1).

Upon determination of Wrap Angle (WA), one can now determine the Lens Base (LB) value, where LB=2, if Θ1≤7 degrees; LB=4, if 7 degrees<Θ1≤14 degrees; LB=6 if 14 degrees<Θ1≤21 degrees; and LB=8, if Θ1>21 degrees. Lens Base (LB) value is a lens manufacturing standard defined in accordance with a spherical cap, as shown in FIG. 5D, where rLB denotes the radius of the sphere rLB, aLB denotes radius of the base of the cap aLB, and hLB denotes the height of the cap.

Figure 5D:
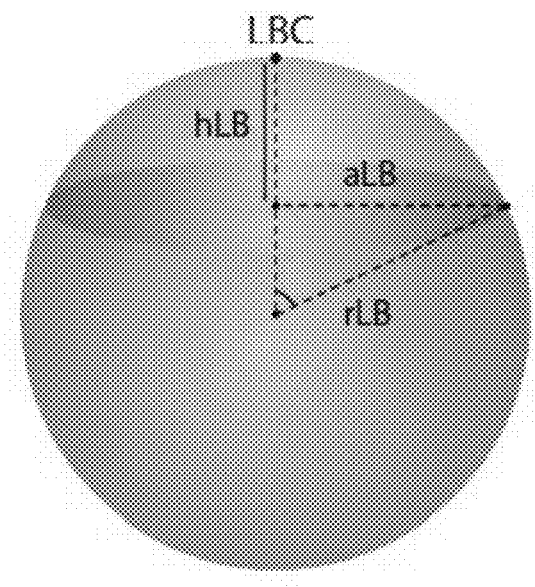

Referring to FIG. 5D, Lens Base Center (LBC) is the apex of the spherical cap or the highest point (coordinate) of cap height hLB. If the LB value is determined to be "2," then define hLB=4.81 mm, aLB=50 mm, and rLB=262.5 mm. If the LB value is determined to be "4," then define hLB=9.9 mm, aLB=50 mm, and rLB=131.25 mm. If the LB value is determined to be "6," then define hLB=15.69 mm, aLB=50 mm, and rLB=87.5 mm. If the LB value is determined to be "8," then define hLB=23.12 mm, aLB=50 mm, and rLB=65.63 mm.

Figures 5E, 5F:
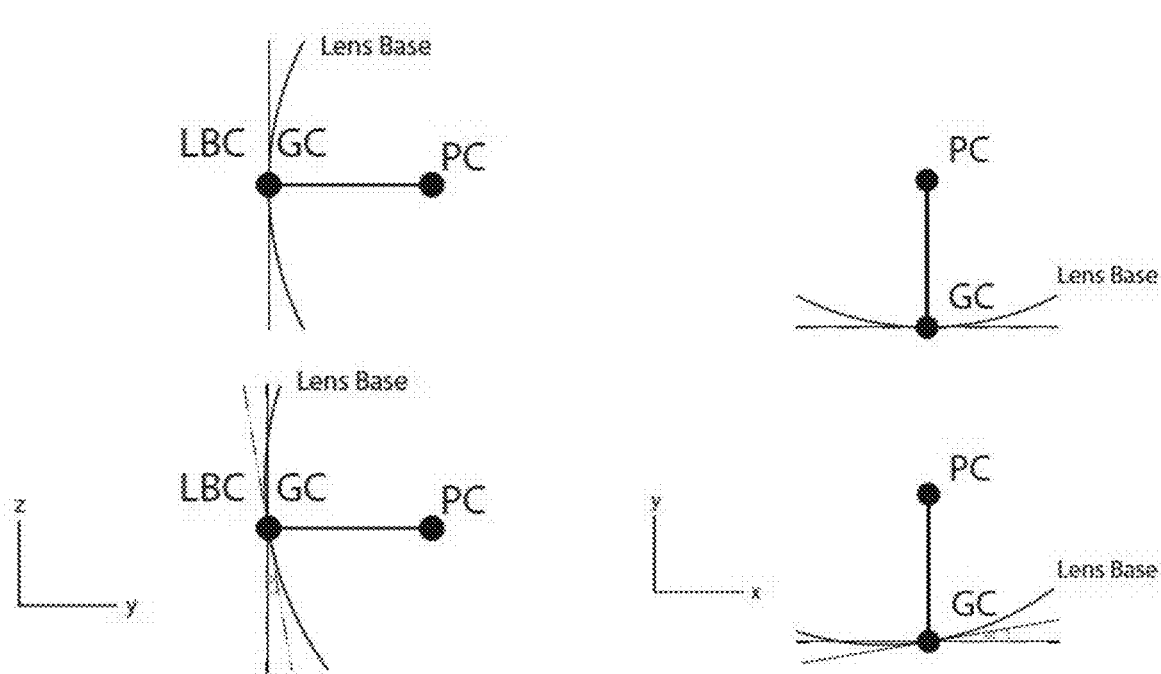
Figure 6:
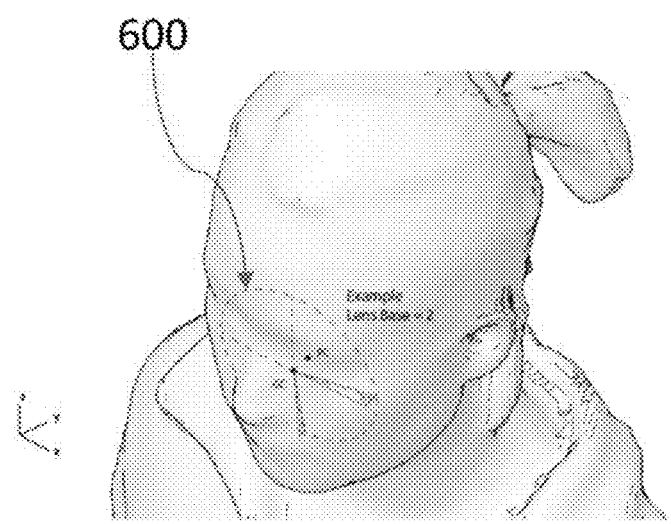
FIG. 6 illustrates a resultant lens base after being aligned in accordance with an embodiment of the present disclosure.

In order to align the lens base, one can align Lens Base Center (LBC) to GC, where LBC=(LBC_x, LBC_y, LBC_z) =GC=(GC_x, GC_y, GC_z) and Lens Base (LB) bulges from Pupil Center (PC). The Lens Base is then rotated counterclockwise about GC on the Y-Z plane for angle Θ which is previously calculated as Pantoscopic Angle (PA) (see, FIG. 5E). Further, the lens base is additional rotated counterclockwise about GC on the X-Y plane for angle Θ1 which is previously calculated as Wrap Angle (WA) (see, FIG. 5F). FIG. 6 illustrates a resultant lens base 600 after being aligned in accordance with an embodiment of the present disclosure. At this point, data for aligned Lens Base 600 are transmitted to box frame generagion module 134, which can serve as a basis for eyewear frame design generation.

Figure 8:
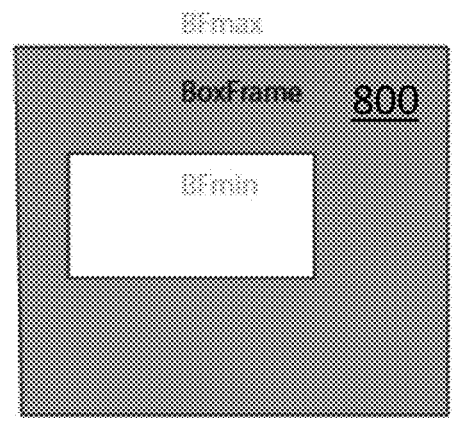
FIG. 8 illustrates a box frame generated in accordance with an embodiment of the present disclosure.
Figure 7A:
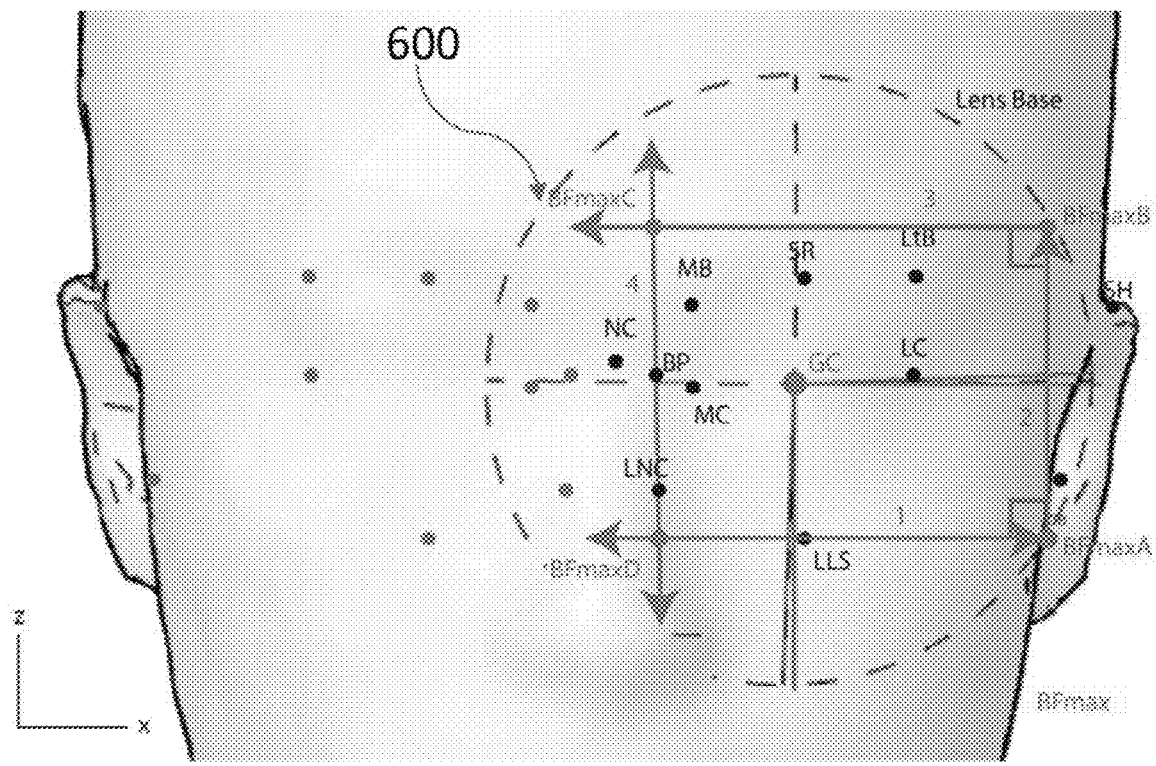
FIGS. 7A and 7B illustrate box frame generation of an eyewear frame in accordance with an embodiment of the present disclosure.
Figure 7B:
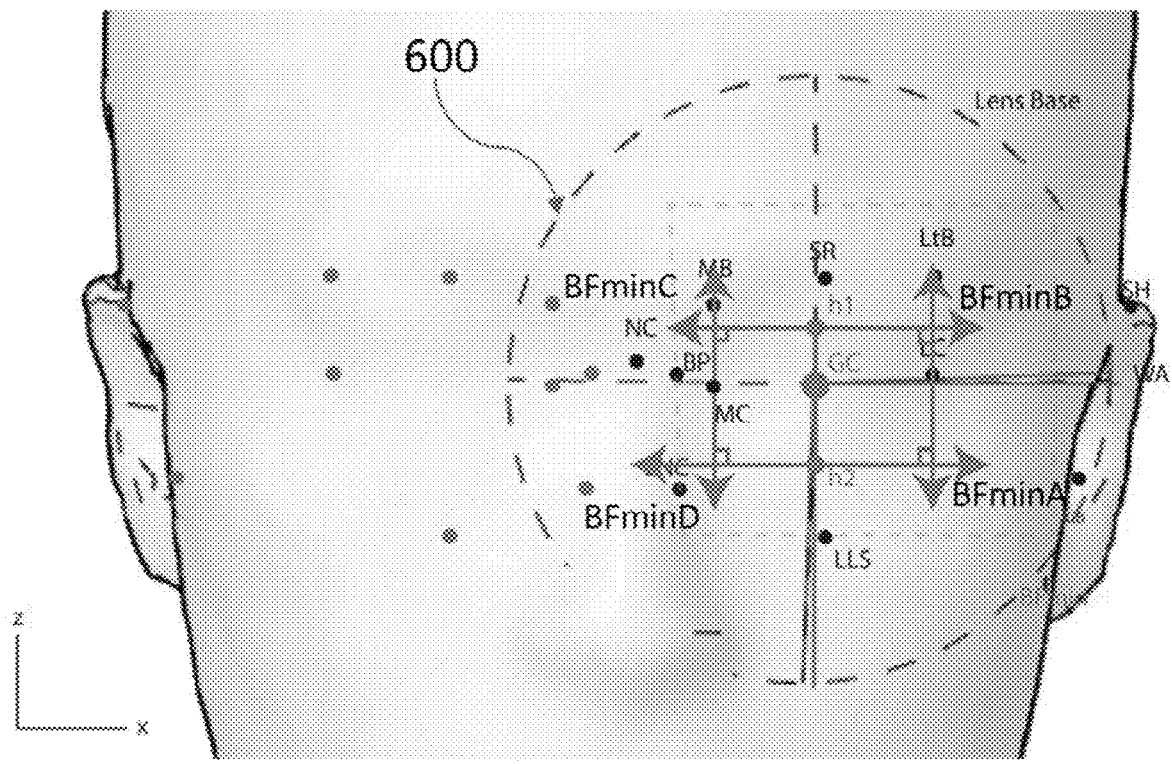

Referring back to FIG. 2B, in Step 234, a box frame of eyewear is generated based on the results of the lens base alignment in Step 232. FIGS. 7A and 7B illustrate box frame generation of an eyewear frame in accordance with an embodiment of the present disclosure. In one embodiment, to determine the box frame of eyewear, one needs to first calculate the box frame maximim (a first quadrilateral area) and the box frame mininim (a second quadrilateral area). FIG. 8 illustrates a box frame 800 generated in accordance with an embodiment of the present disclosure. In this embodiment, box frame 800 is the area of box frame maximum (BFmax, the first quadrilateral area) subtracted by box frame minimum (BFmin, the second quadrilateral area).

Box frame maximum (BFmax) can be calculated in the X-Z coordinate with the Y-value being set to 0. Referring to FIG. 7A, a horizontal line is projected through LLS, which intersects with Lens Base 600 at point BFmaxA, and a vertical line is projected upward from BFmaxA, which intersects with Lens Base 600 at BFmaxB. In addition, a horizontal line is projected inward from BFmaxB. A straight line passing through LNC and BP intersects with the horizontal line from LLS at BFmaxD and intersects with the horizontal line from BFmaxB at BFmaxC. The lines that connect points BFmaxA, BFmaxB, BFmaxC, BFmaxD form a right trapezoid. In one embodiment, the box frame maximum can be defined as a quadruplet, i.e., BFmax=(BFmaxA, BFmaxB, BFmaxC, BFmaxD).

Box frame minimum (BFmin) can be similarly calculated in the X-Z coordinate with the Y-value set to be 0. Referring to FIG. 7B, one can define a first point h1=(h1_x, 0, h1_z) as the middle point of SR_z and GC_z, which can then be calculated as follows: h1_x=GC_x; h1_y=0; and h1_z=GC_z+½|SR_z−GC_z|. Further, one can define a second point h2=(h2_x, 0, h2_z) as the middle point of LLS_z and GC_z, which can then be calculated as follows: h2_x=GC_x; h2_y=0; and h2_z=GC_z−½|LLS_z−GC_z|. Thereafter, a first horizontal line is projected passing through h1, a second horizontal line is projected passing through h2, a first vertical line is projected passing through MC, and a second vertical line is projected passing through LC. The first and second horizontal lines and the first and second vertical lines intersect (at four points BFminA, BFminB, BFminC, and BFminD), and form a rectangle which defines the box frame minimum as a quadruplet, i.e., BFmin=(BFminA, BFminB, BFminC, BFminD).

In one embodiment, a user can be given a plurality of pre-defined design box frames as selectable options. Specifically, a design box frame is a 3D model of eyewear frame having an aesthetic and/or stylistic appearance designed by an eyewear designer. After selecting one from the available design options, the pre-defined design box frame can then be adjusted in size in accordance with the calculated box frame 800 and applied to the calculated box frame 800. In one embodiment, the size of the pre-defined design box frame can be scaled up or scaled down proportionally such that the selected design box frame can fit within the area of the calculated box frame.

Figure 9A:
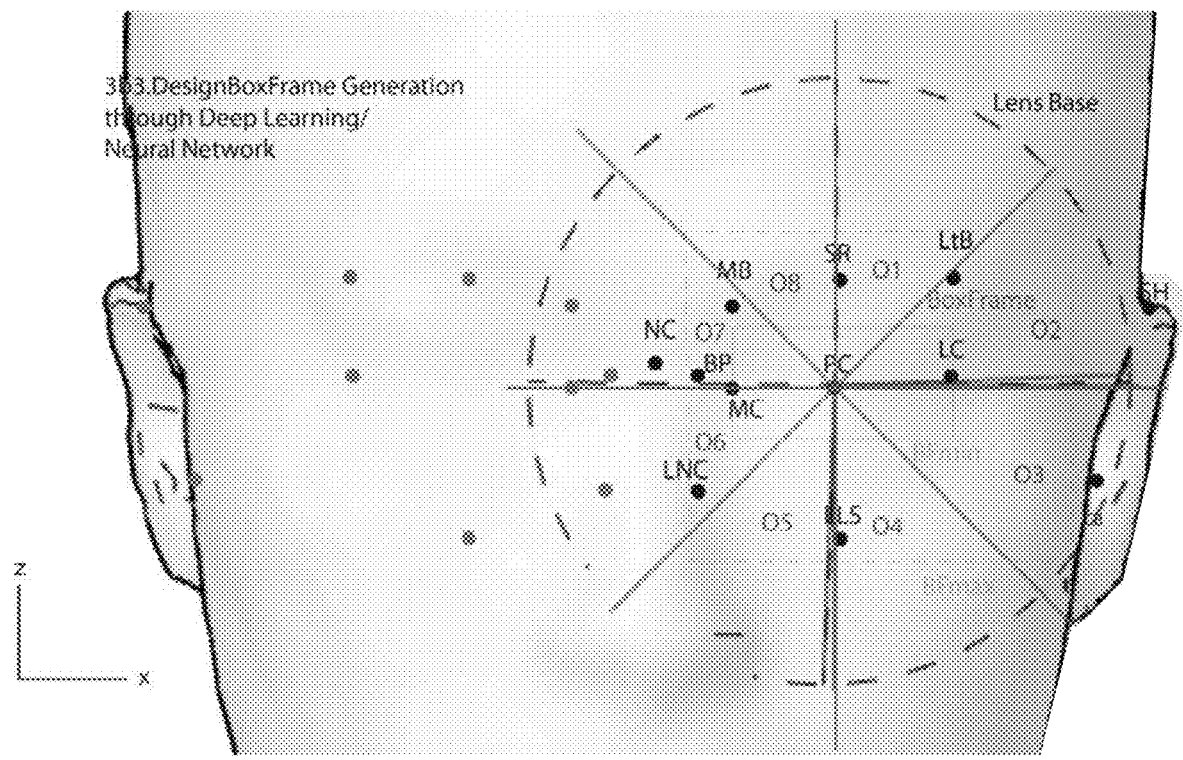
FIGS. 9A, 9B, 9C, and 9D illustrate design box frame generation of an eyewear frame in accordance with an embodiment of the present disclosure.
Figure 9B:
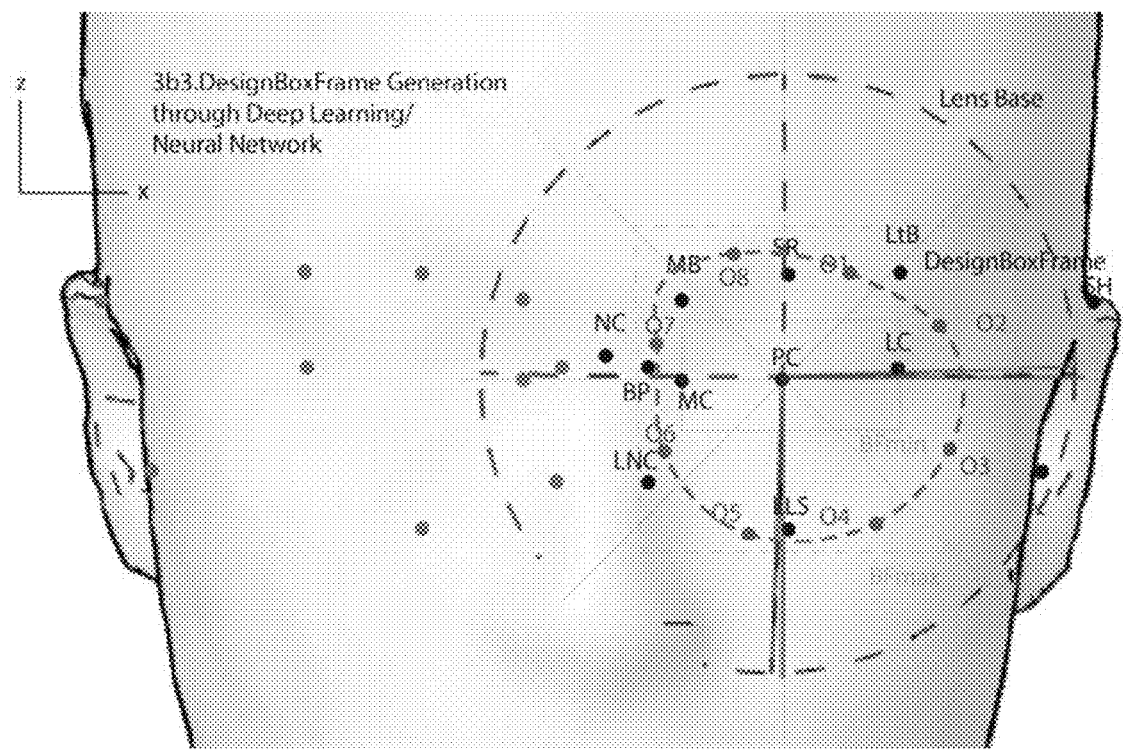
Figure 9C:
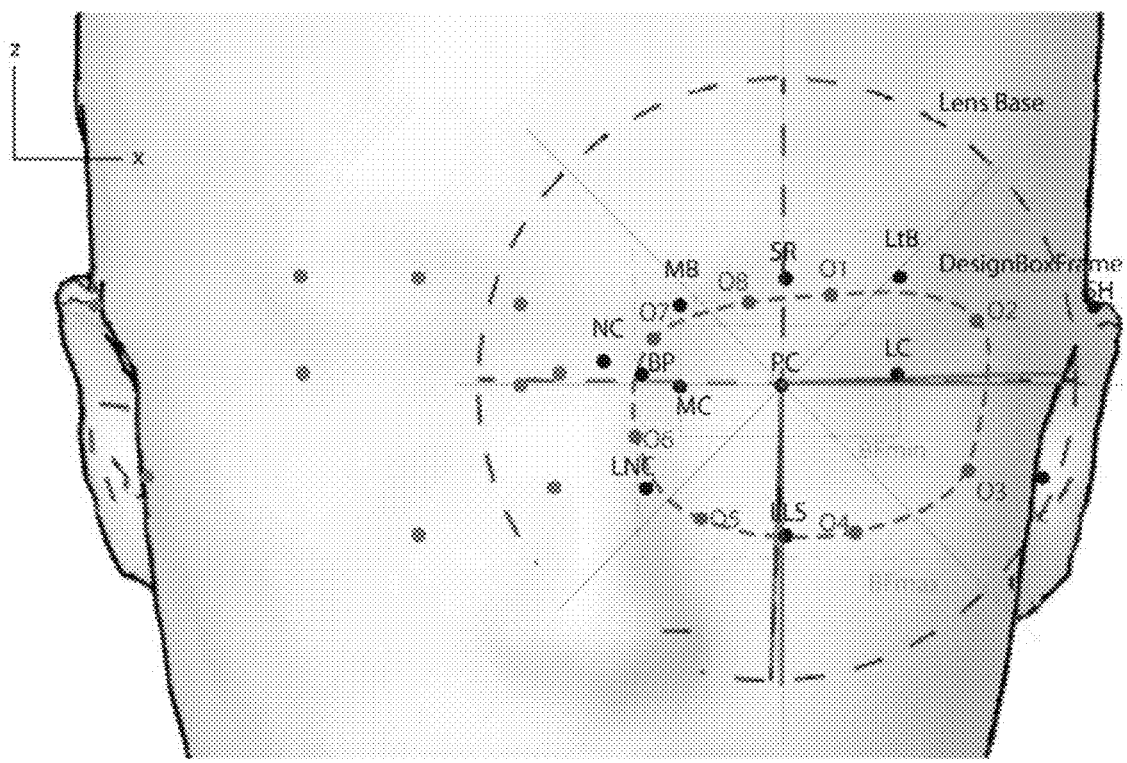

FIGS. 9A, 9B, and 9C illustrate the generation of a design box frame of an eyewear frame in accordance with an alternative embodiment of the present disclosure. In this embodiment, a design box frame can be generated using, for example, an artificial intelligence (AI) system through deep learning and/or neural network.

Referring to FIG. 9A, a box frame (or BoxFrame) is divided into octants split from Pupil Center (PC). Referring to FIG. 9B, each octant area is randomly assigned a point O1, O2, O3, O4, O5, O6, O7, and O8 therein. Points O1, O2, O3, O4, O5, O6, O7, and O8 can be connected using a closed spline contained within BoxFrame. The spline defines a design box frame (or DesignBoxFrame) which can then be assigned an aesthetic value or score by a designer, ranging from 1 to 10, for example.

During an early stage of the learning process having, for example, 10 or fewer training data, DesignBoxFrame is a closed-spline that connects randomly assigned points O1 through O8. At this stage, the neural network still has a low confidence level on each of the aesthetic scores (1-10). For example, a 40% confidence level is given to an aesthetic score of 5 (medium value), because a human designer would have given an aesthetic score of 2 to the same design (low value, not matching the prediction). Neutral network can take the feedback of human designers and make adjustments through back-propagation. This allows better prediction at a higher confidence level on the aesthetic score if a similar design is randomly generated again.

During a later stage of the learning process having, for example, 1,000 or more training data, a new DesignBoxFrame can be similarly generated by randomly assigned points O1 through O8. Now that the neural network may have a higher confidence level on higher aesthetic scores. For example, a 90% confidence level may be given to an aesthetic score of 8, because a human designer would give an aesthetic score of 8 to the same design (matching prediction). Neutral network can then take the feedback with increased confidence and make adjustments through back-propagation.

Up to this point, the selected DesignBoxFrame stays in two-dimension with the Y-values of all points O1 through O8 being set to zero. Specifically, DesignBoxFrame can be defined by points O1 through O8, where O1=(O1_x, 0, O1_z), O2=(O2_x, 0, O2_z), O3=(O3_x, 0, O3_z), O4=(O4_x, 0, O4_z), O5=(O5_x, 0, O5_z), O6=(O6_x, 0, O6_z), O7=(O7_x, 0, O7_z), and O8=(O8_x, 0, O8_z). Thereafter, each of points O1 through O8 is projected to the Lens Base (spherical cap) and the Y-values of points O1 through O8 are extracted from the corresponding Y-values of Lens Base (LBy) for each of points O1 through O8. Specificly, after the Y-value projection, points O1 through O8 can be defined as follows: O1=(O1_x, LB_y(O1), O1_z); O2=(O2_x, LB_y(O2), O2_z); O3=(O3_x, LB_y(O3), O3_z); O4=(O4_x, LB_y(O4), O4_z); O5=(O5_x, LB_y(O5), O5_z); O6=(O6_x, LB_y(O6), O6_z); O7=(O7_x, LB_y(O7), O7_z); and O8=(O8_x, LB_y(O8), O8_z). Now that DesignBoxFrame is projected to a spherical cap (or Lens Base) instead of a 2-dimensional spline curve.

Figure 9D:
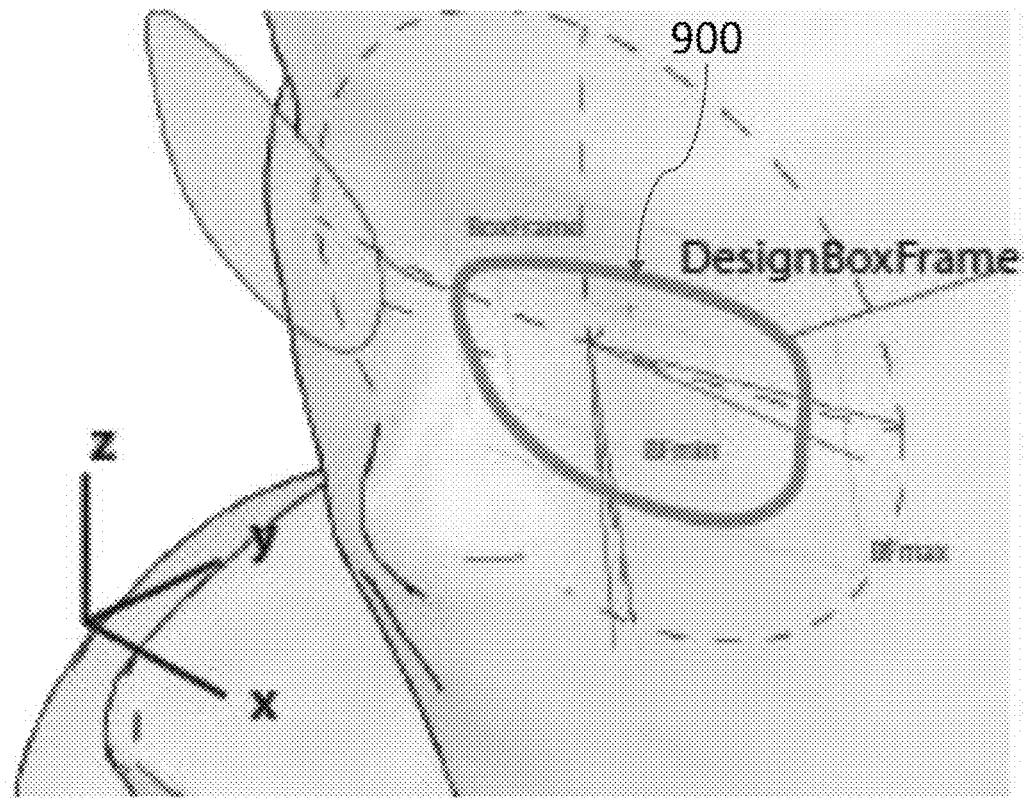

FIG. 9D illustrates a design box frame 900 so generated, in accordance with an embodiment of the present disclosure. A lens bases (made of, for example, glass, plastic, or other suitable materials) can be cut in accordance with the shape of design box frame 900 such that the cut lenses can be inserted and embedded in bespoke eyewear frame 2 after being additively manufactured. Although only one (left) side of design box frame 900 is shown and described, it is appreciated that the same process can be used to generate the other (right) side of the design box frame 900.

Figure 10:
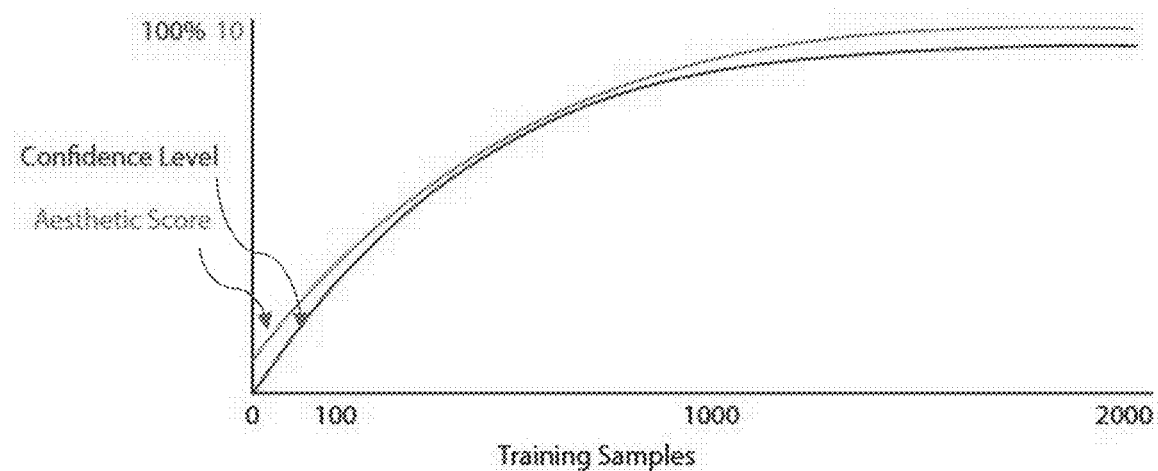
FIG. 10 illustrates a relateion between the aesthetic score and the confidence level of randomly generated design box frames in accordance with an embodiment of the present disclosure.

The AI system can learn from a large number of data sets using deep learning and can derive a corresponding confidence level for a newly, randomly generated DesignBoxFrame. The confidence level of achieving a high score can start from very low (close to 1) with randomly assigned points O1 through O8 to a much higher score (5 or 6) after making a few predictions in comparison with designer's evaluations. As training samples grow, the AI system can adjust its neural network through back-propagation and slowly learn to generate a design box frame with a higher aesthetic value and with higher confidence level. Over time, the neural network of the AI system can learn the relation between points O1 through O8 and facial parameters 400, which can be used to serve the goal of generating a DesignBoxFrame with a higher aesthetic score and a higher confidence level. FIG. 10 illustrates a relation between the aesthetic score and the confidence level of randomly generated design box frames in accordance with an embodiment of the present disclosure.

Figure 11A:
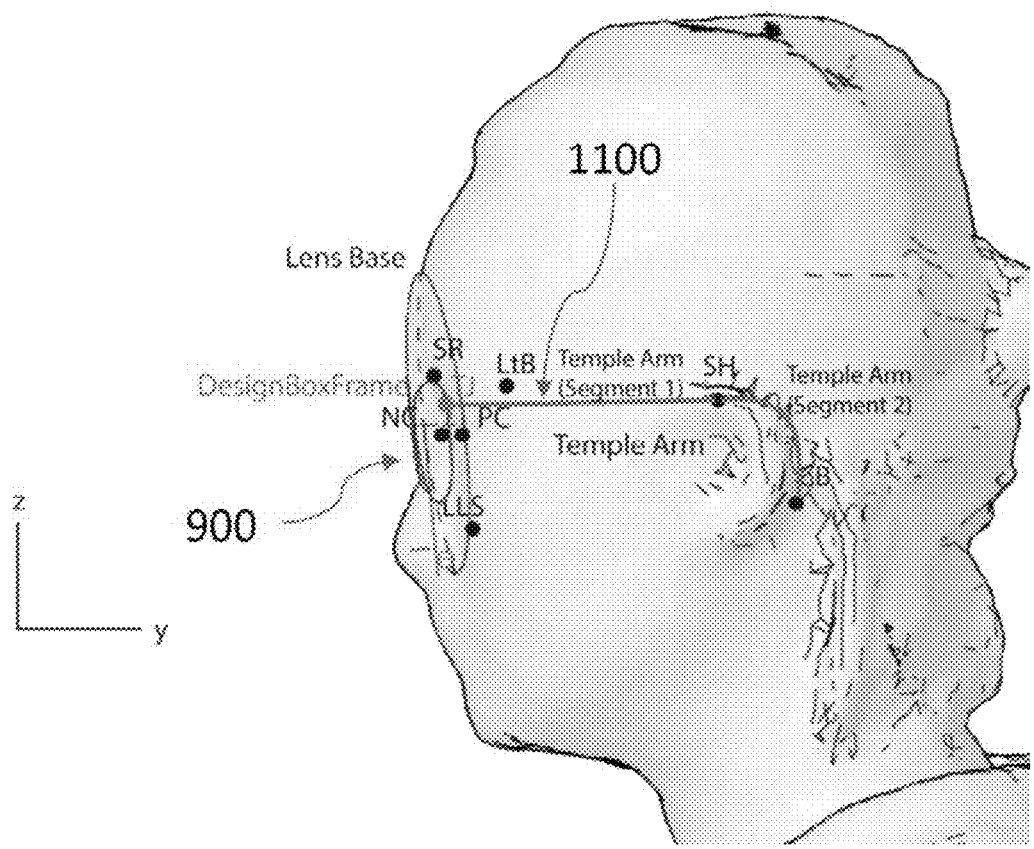
FIGS. 11A, 11B, and 11C illustrate the generation of temple arms, nose pads, and nose bridge of an eyewear frame in accordance with an embodiment of the present disclosure.
Figure 11B:
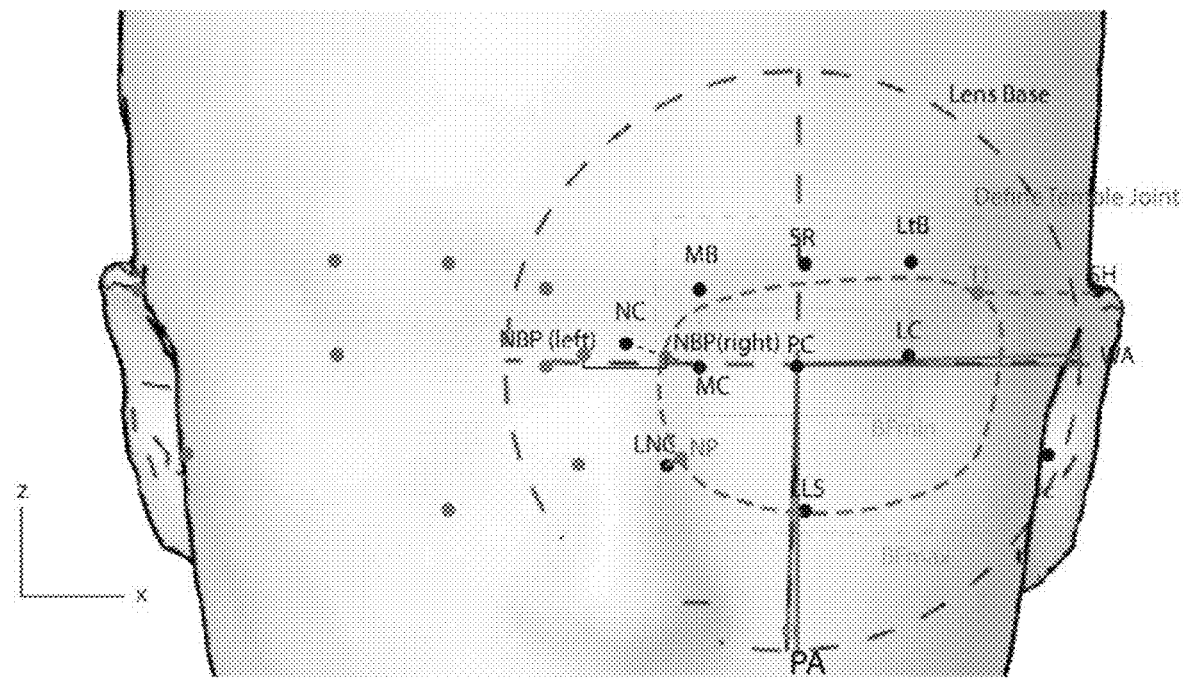
Figure 11C:
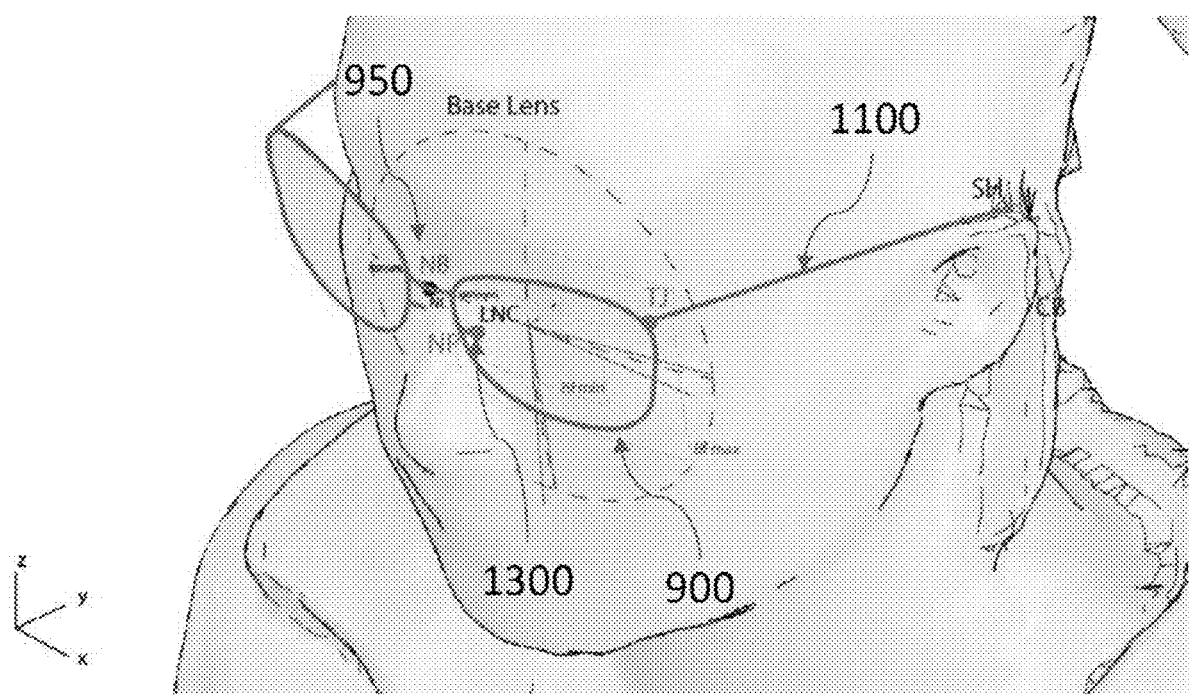

Referring back to FIG. 2B, in Step 236, temple arm and nose pad generation module 136 can generate temple arms, node bridge, and nose pads of an eyewear based on the design box frame generated in Step 234. FIGS. 11A, 11B, and 11C illustrate the generation of temple arms, nose pads, and nose bridge of an eyewear frame in accordance with an embodiment of the present disclosure.

Referring to FIG. 11A, before generating a temple arm 1100, temple joint (TJ) point on design box frame 900 can be calculated first. Temple joint TJ can be determined on the Y-Z plane with the X-value being set to 0, and then on the X-Z plane with the Y-value being set to 0. In one embodiment, a horizontal line on the Y-Z plane can be projected passing through Super Helix (SH) and intersecting with design box frame 900 at temple joint (TJ) to determine TJ_y and TJ_z.

Referring to FIG. 11B, the X-value of temple joint (TJ) (namely, TJ_x) can then be determined as the X-value of a point R=(R_x, R_y, R_z) of design box frame 900, where R_y=TJ_y and R_z=TJ_z. As a result, the TJ value (TJ_x, TJ_y, TJ_z) is determined. In one embodiment, TJ and SH can be connected to form the first segment of temple arm 1100. Upon creation of the first section of temple arm 1100, an arc connecting SH and CB can be generated to form the second segment (often called temple tip) of temple arm 1100. Temple arm 1100 can be created by combining the first and second segments.

Referring to FIGS. 11B and 11C, Nose Bridge Point (NBP) can be calculated on the X-Z plane with the Y-value being set to be 0. First, Nasal Crest (NC) and Medial Canthus (MC) of facial parameters 400 can be connected to intersect with design box frame 900 at NBP, where NBP=(NPB_x, 0, NBP_z). The Y-value of NBP (namely, NBP_y) can then be extracted from design box frame 900 to obtain NBP=(NBP_x, NBP_y, NBP_z). The same process applies symmetrically to either side of the Nose Bridge Point. As a result, NBP_left and NBP_right are obtained. In one embodiment, the Nose Bridge (NB) 950 can be formed using any suitable arc that connects NBP_left and NBP_right, as shown in FIG. 11C. Further, the nose pad (NP) 1300 can be calculated by connecting LNC to the closet point on design box frame 900.

Referring back to FIG. 2B, in Step 238, hinge generation module 138 can generate hinges that connect design box frame 900 and temple arms 1100 in accordance with an embodiment of the present disclosure. Due to the nature of additive manufacturing, temple arms 1100 and design box frame 900 do not need to be separately produced in pieces. Rather, hinges of bespoke eyewear frame 2 can be seamlessly manufactured at the same time with temple arms 1100 and design box frame 900, so as to avoid manual or robotic assembly.

FIGS. 12A, 12B, 12C, and 12D illustrate various views of a hinge structure 1200 of bespoke eyewear frame 2 in accordance with embodiments of the present disclosure. Referring to FIGS. 12A, 12B, 12C, and 12D, in one embodiment, hinge structure 1200 includes a post 1110 integrally formed on temple arm 1100 and a knuckle 910 integrally formed on design box frame 900.

Post 1110 may have a cylindrical shape integrally formed on and connected with an end of temple arm 1100 through two legs 1102. Knuckle 910 may have a substantially spherical shape with a cylindrical throughhole to accommodate post 1110 therein. A recess 1105 having a shape complimentary to that of knuckle 910 may be formed on temple arm 1100 and between the two legs of post 1110, so as to receive at least a portion of knuckle 910 therein. In this manner, temple arm 1100 can be rotated about hinge structure 1200 between an collapsed position and an expanded with good mechanical stability.

Hinge structure 1200 may optionally include a lock positive 1120 on temple arm 1100 and a lock negative 920 on design box frame 900. As such, when temple arm 1100 is rotated about hinge structure 1200 to an expanded position, lock positive 1120 and lock negative 920 can engage with each other so as to enhance the mechanical stability of design box frame 900 and temple arm 1100. It is appreciated that, in an alternative embodiment, lock positive 1120 may be formed on design box frame 900, while lock negative 920 may be formed on temple arm 1100.

Figures 12A, 12B:
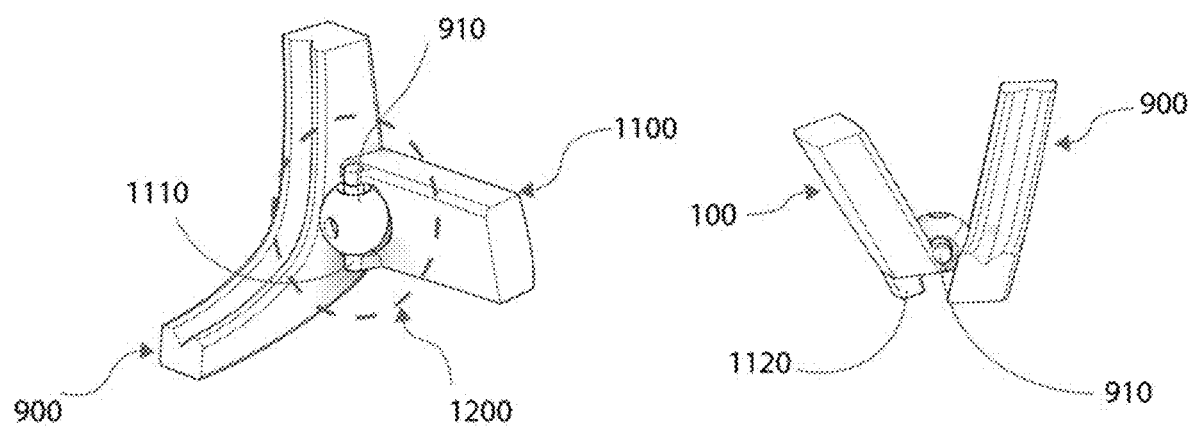
FIGS. 12A, 12B, 12C, and 12D illustrate various views of a hinge structure of bespoke eyewear frame 2 in accordance with embodiments of the present disclosure.
Figures 12C, 12D:
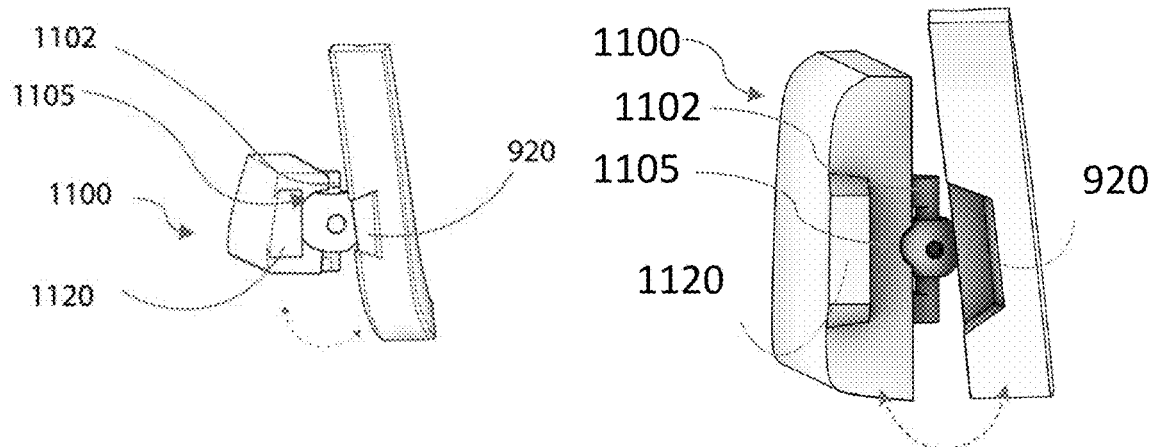
Figure 13:
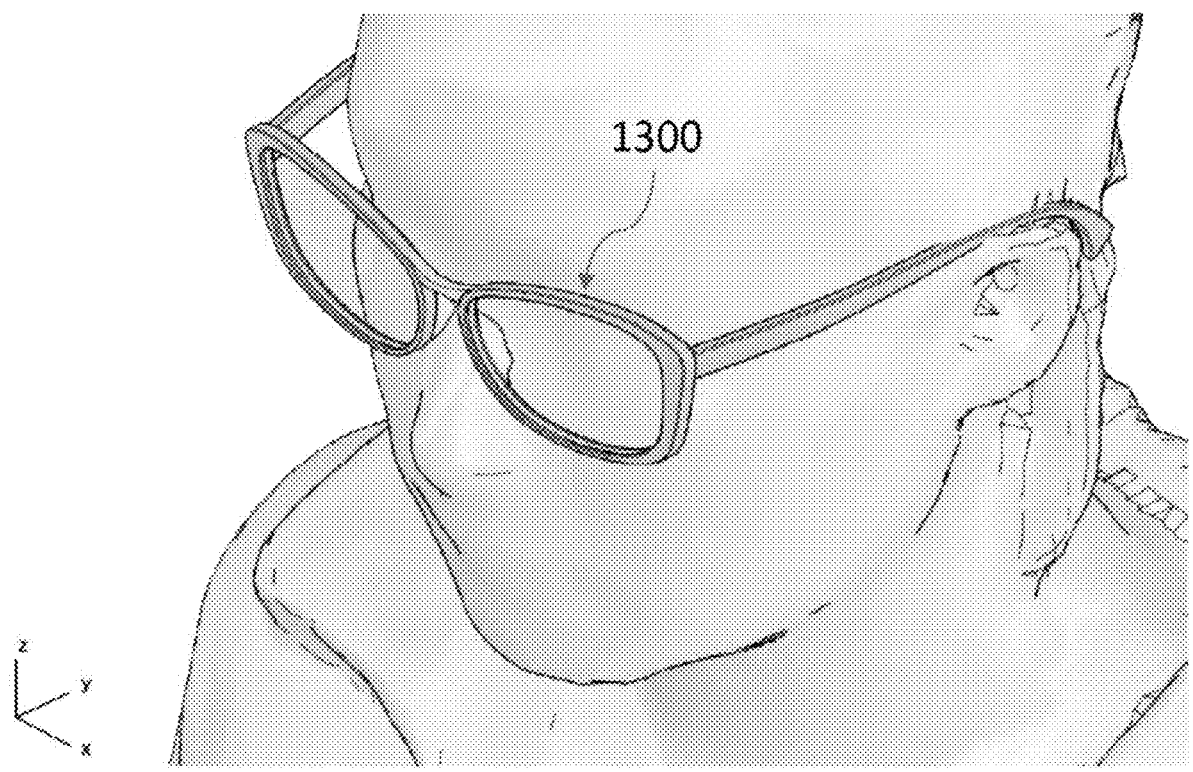
FIG. 13 illustrates a 3D model of a bespoke eyewear generated in accordance with an embodiment of the present disclosure.

In one embodiment, as shown in FIG. 12C, lock positive 1120 comprises a protrusion having an obtuse trapezoidal shape, while lock negative 920 comprises a recess having a complementary obtuse trapezoidal shape. One advantage for lock positive 1120 and lock negative 920 to have complementary obtuse trapezoidal shapes is that the user can experience a mechanical click when lock positive 1120 and lock negative 920 are properly engaged with each other. In another embodiment, as shown in FIG. 12D, lock positive 1120 comprises a protrusion having an acute trapezoidal shape, while lock negative 920 comprises a recess having a complementary acute trapezoidal shape. As shown in FIGS. 12C and 12D, both of the acute and obtuse trapezoidal shapes are also isosceles. It is appreciated that lock positive 1120 and lock negative 920 can have any other appropriate shapes. Upon completion of Step 230, eyewear frame generation module 130 transmits the generated 3D model to design variation module 140 for further processing. Referring again to FIG. 2A, in Step 240, design variation module 140 applies design variations to the generated 3D model based on the customer's likings. In one embodiment, the design variation may include, for example, thickness of temple arm 1100, shape and/or decorative features of design box frame 900, types (angled, curved, or straight) of the temple tip of temple arm 1100, materials of bespoke eyewear frame 2, and the like. FIG. 13 illustrates a 3D model 1300 of bespoke eyewear frame 2 generated in accordance with an embodiment of the present disclosure. Design variation module 140 can then transmit the 3D model 1300 of bespoke eyewear frame 2 to file conversion module 150, where the 3D model is converted to a 3D printable file format. Upon completion of the eyewear frame design process, in Step 260, the 3D printable file from file conversion module 150 is transmitted to production apparatus 200 where bespoke eyewear frame 2 can be additively manufactured in accordance with the 3D printable file.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A method for manufacturing a bespoke eyewear frame, the method comprising:
   capturing one or more facial images of a user using an image capturing device;
   generating a facial model from said one or more facial images;
   extracting a plurality of facial parameters from the facial model;
   generating a three-dimensional digital model of an eyewear frame based at least in part on one or more of the facial parameters of the user; and
   transmitting the three-dimensional digital model to an additive manufacturing apparatus for additively manufacturing the bespoke eyewear frame;
   wherein generating the three-dimensional digital model comprises:
      aligning a lens base in accordance with one or more of the facial parameters, the lens base being defined by a plurality of lens parameters; and
      generating the three-dimensional digital model of the eyewear frame based on the aligned lens base, comprising:
         generating a box frame defined as an area between a quadrilateral box frame maximum and a quadrilateral box frame minimum in accordance with one or more of the facial parameters and the lens parameters of the aligned lens base;
         generating a design box frame within the area of the box frame;
         generating temple arms, a nose pad, and a nose bridge mechanically coupled with the design box frame; and
         generating a seamless hinge structure pivotably connecting the temple arms and the design box frame.

2. The method of claim 1, wherein the facial parameters include a Nasal Crest (NC) and a Pupil Center (PC), and the lens parameters include a Geometric Center (GC), a Wrap Angle (WA), and a Pantoscopic Angle (PA), and wherein aligning the lens base comprises:
   determining the Pantoscopic Angle (PA) and the Wrap Angle (WA);
   rotating the lens base on a first plane about the Geometric Center (GC) for the Pantoscopic Angle (PA); and
   rotating the lens base on a second plane about the Geometric Center (GC) for the Wrap Angle (WA), the second plane being perpendicular to the first plane.

3. The method of claim 1, wherein generating the seamless hinge structure comprises:
   generating a post integrally formed on the temple arms; and
   generating a knuckle integrally formed on the design box frame and mechanically engaged with the post.

4. The method of claim 1, further comprising applying design variations to the three-dimensional digital model based on a pre-determined aesthetic style of the bespoke eyewear frame.

5. The method of claim 1, further comprising, prior to transmitting the three-dimensional digital model to the additive manufacturing apparatus, converting the three-dimensional digital model into an additively printable format.

* * * * *